Patented Nov. 7, 1922.

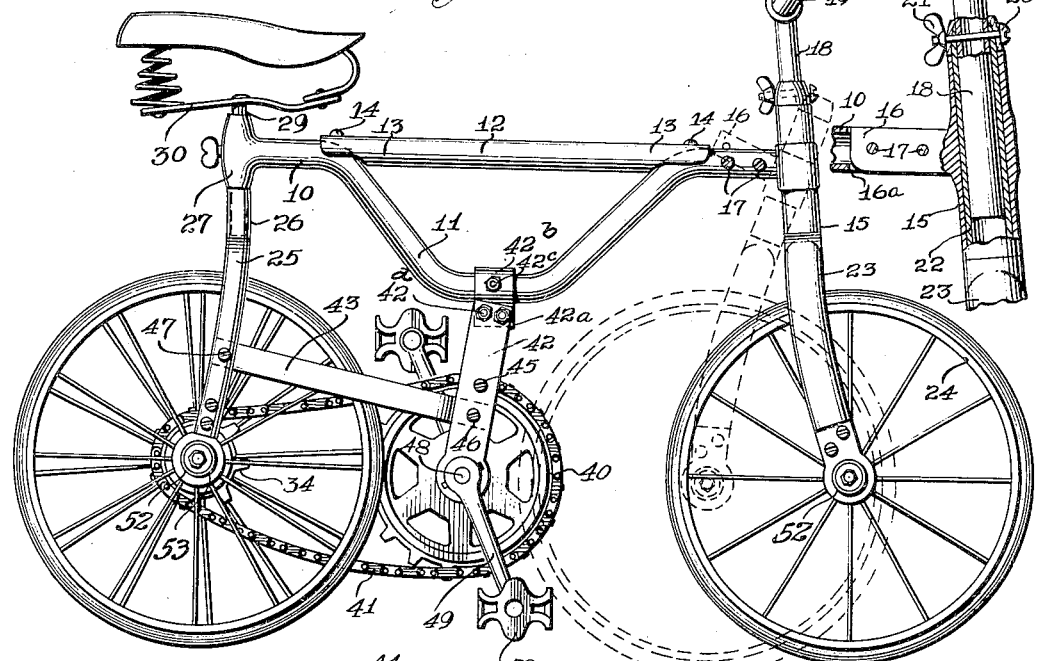

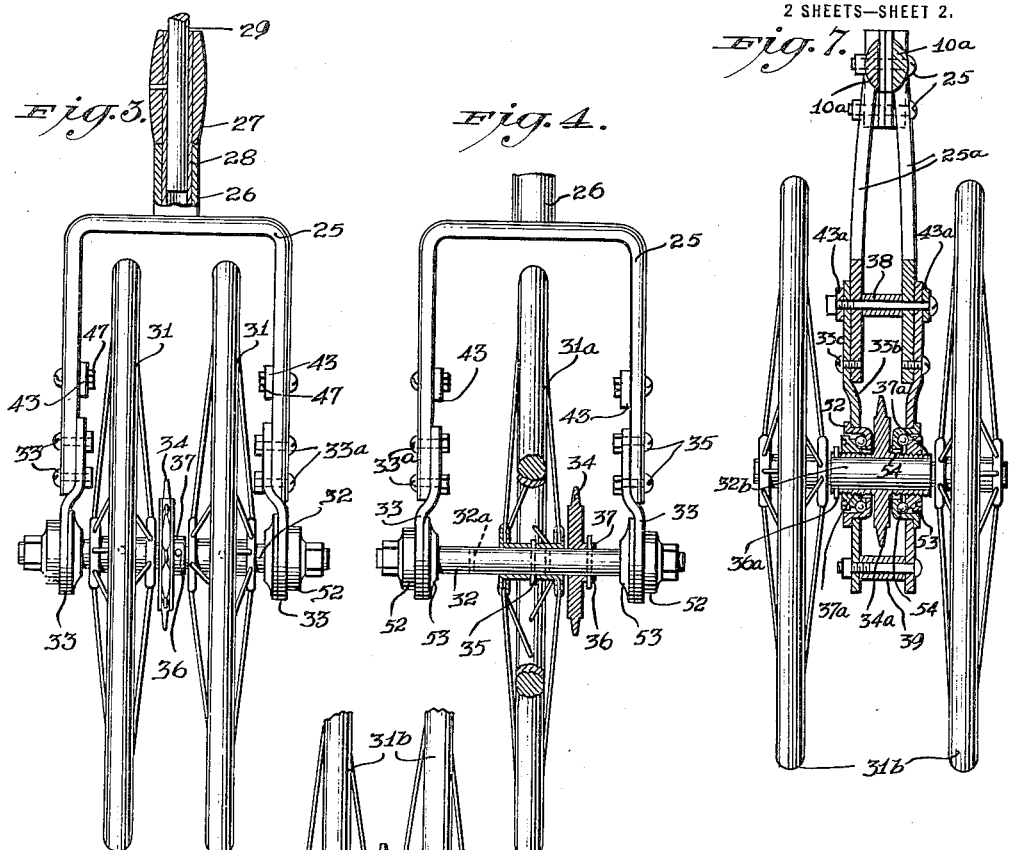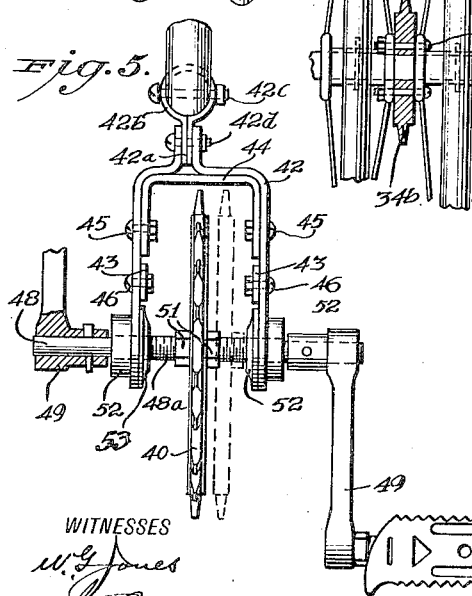

1,434,701

UNITED STATES PATENT OFFICE.

JOHN HUDRY, OF HAZLETON, PENNSYLVANIA.

VELOCIPEDE.

Application filed December 3, 1920. Serial No. 428,046.

*To all whom it may concern:*

Be it known that I, JOHN HUDRY, a citizen of the United States, and a resident of Hazleton, in the county of Luzerne and State of Pennsylvania, have invented a new and Improved Velocipede, of which the following is a description.

My invention relates to a velocipede adapted to be converted from one type of vehicle into another and embodying features relating to the adjustment and adaptation of the frame, to a particular arrangement of the wheels, and drive, as well as features involving the folding or the knockdown character of the vehicle, the invention being in the same general line as previous structures patented by me, as follows: Number 1,218,943, granted March 13, 1917; Number 1,274,045, granted July 30, 1918; and Number 1,326,148, granted December 23, 1919.

The general object of my invention is to provide a velocipede involving a chain and sprocket drive and in which provision is made for adapting the chain and sprocket drive either to a single rear wheel in a plane approximately at the medial line of the velocipede or to a pair of rear wheels disposed at opposite sides of the medial line.

An important object of the invention also is to provide ball bearings in the frame parts of the machine for an axle adapted to receive ordinary non-ball bearing wheels usually employed in the construction of children's velocipedes, whereby to give the wheels ball bearing support without the necessity of employing special makes of wheels having ball bearings in the hubs thereof.

A further object of the invention is to provide means to support a pair of rear wheels with the wheels at either the inside or outside of the frame; to provide a laterally adjustable sprocket adapted to either one or two wheels or different positions of a pair of wheels; as well as to variously improve the backbone, front fork, rear fork, and other parts of the frame of the velocipede with a view to the convertibility of the same and the giving of knockdown form thereto, the convertible features including a backbone variable to convert the vehicle either into a boy's velocipede or a girl's velocipede.

The above objects and others as will appear are attained by novel means which can be best explained in connection with a description of practical embodiments of the invention as hereinafter given.

Reference is to be had to the accompanying drawings forming a part of this specification, it being understood that the drawings are merely illustrative of practical examples of the invention in its different arrangements.

Figure 1 is a side elevation of a velocipede embodying my invention with the sprocket and chain drive coordinated with a pair of rear wheels between the members of the rear fork;

Figure 2 is a partly sectional side elevation on an enlarged scale of the adjustable head for the front fork and handlebar post;

Figure 3 is a rear view of the rear fork with a pair of wheels, the rear head of the backbone and the adjacent portion of the fork being in section, the view including in elevation a fragment of the seat post;

Figure 4 is a rear elevation of the fork with a single wheel disposed between the members thereof, said wheel as well as the driven sprocket on the axle of the wheel being in section;

Figure 5 is a fragmentary view in rear elevation of the drive sprocket and pedals and a novel hanger therefor;

Figure 6 is a side elevation of frame parts including the backbone, rear fork integral therewith, and a hanger to be hereinafter referred to;

Figure 6ª is a detail in cross section on the line 6ª—6ª, Figure 6, the view being given to show the modified hanger for the drive sprocket axle;

Figure 7 is a transverse section on the line 7—7, Figure 6, of the frame parts, the view including a pair of wheels disposed outside of the rear fork;

Figure 8 is a rear elevation of a rear fork that may be employed with an axle having wheels at the outside of the fork;

Figure 9 is a side elevation of the fork shown in Figure 8;

Figure 10 is a fragmentary side elevation with a modified attachment for the backbone of drop form and to be hereinafter referred to.

Figure 11 is a partly sectional rear elevation of a running wheel and driven sprocket unit, the unit presenting a hub to receive an axle.

In the illustrated example of my invention a backbone designated generally by the numeral 10 is provided, said backbone having a drop 11 therein as in a girl's velocipede. The drop portion of said backbone is bridged to give the backbone the general form of a boy's velocipede. In the form shown in Figure 1 a tubular piece 12 bridges the drop 11, the ends having cut-outs so that the upper portion of said bar at the ends presents concavo-convex terminals to conform to the transverse rounded form of the backbone and to the bends at the juncture of the drop 11 and the straight portions of the backbone. The ends 13 may be suitably held by removable fastening means such as screws 14. The bridge-piece 12, or equivalent bridge-piece as next described, when in place over the drop 11 and secured at its ends not only lends to the backbone the appearance of that of a boy's velocipede but lends strength to the backbone to withstand the rough usage to which a velocipede may be expected to be subjected by boys.

In the form shown in Figure 6 the backbone 10$^a$ has a drop 11$^a$ which is bridged by a straight piece 12$^a$ having flattened ends 13$^a$ presenting bolt holes 14$^a$ to receive fastening bolts. The fastening bolt at either end of the bar 12$^a$ may be removed, preferably the rear bolt, so that the bridge-piece 12$^a$ may be swung in a vertical plane away from the drop to give the backbone a form as in a girl's velocipede or said base 12$^a$ may be entirely removed, if desired.

In Figure 10 the drop 11$^b$ of the backbone 10$^b$ is bridged by a basket structure 12$^b$ formed of bat strips and generally conforming to the drop, there being securing members 13$^b$ at the front and rear of said basket bridge-piece, and secured by screws 14$^b$ or the like to the adjacent straight portions of the backbone 10$^b$.

In my present invention I provide for mounting the front fork to permit it to swing rearwardly in a vertical plane to give the velocipede a more compact form. The illustrated means for the purpose consists of a head 15 having a rear extension 17 at the approximate center accommodated in a slot 16$^a$ in the adjacent end of the backbone 11 and held by transverse screws or bolts 17, one of which may be removed to permit the head and the front fork and wheel carried thereby to assume the position indicated in dotted lines in Figure 1. The numeral 18 indicates the vertical post of the handlebar 19 through which a transverse bolt 20 passes having a wing nut 21 or the like, said bolt passing also through the upper reduced end 22 of the front fork 23 mounting the front wheel 24.

In the form shown in Figure 1 the rear fork 25 is provided on the top or bight with an upstanding boss 26 abutting against the lower end of a tubular T-head 27 on the backbone 10. A bushing 28 extends through the T-head 27 and into boss 26 and receives the post 29 of the improved seat 30.

Provision is made for the mounting of two rear wheels 31 within the rear fork 25 at planes at opposite sides of the medial line of the velocipede as in Figures 1 and 3 or a single rear wheel 31$^a$ in the medial plane of the velocipede, said wheels being mounted on an axle 32 turning in suitable bearings as hereinafter described in hangers 33 in the lower ends of fork 25, said hangers being here shown as secured by bolts 33$^a$.

With two wheels within fork 25 a driven sprocket wheel 34 is mounted on axle 32 at the medial line of the velocipede, while said sprocket may be shifted laterally on axle 32 to a plane at one side of the medial line as in Figure 4. The sprocket wheel 34 is provided with a bushing 37, fitting the axle 32. Suitable means is provided for fastening either one or two wheels on the axle 32 and for securing the driven sprocket 34 in either position. In the illustrated example the axle is provided with holes 32$^a$ which are positioned to receive a central pin 35 for a single wheel at the medial line and to receive a pin 36 for fastening the bushing 37 with the sprocket wheel 34 at the medial line or for fastening two wheels 31 within fork 25 and in planes at the side of the medial line. A modified fork is shown in Figures 6 and 7, the same being part of a modified backbone 10$^a$ formed in two half sections, secured by suitable fastening means which may include transverse bolts 25$^b$ at the juncture of the backbone 10$^a$ and rear fork 25$^a$, as well as transverse screw bolts 38, 39, the latter passing through hangers 33$^b$, secured to the fork members, said hangers being shown as secured to the fork by the bolt 38 and by a screw 33$^c$. The members of the modified fork lie close together sufficient to accommodate only a driven sprocket 34$^a$ having a bushing 37$^a$ secured by a pin 36$^a$ to axle 32$^b$, said axle projecting at both sides of the fork 25$^a$ and accommodating a pair of wheels 31$^b$ in planes outside of the fork.

In making provision for the chain and sprocket drive, a drive sprocket 40 is provided and a chain runs over said drive sprocket, and over the driven sprocket 34 or 34$^a$. The drive sprocket 40 is mounted on an axle 48 having the cranks 49 provided with pedals 50. Said axle 48 turns in a forked hanger 42, Fig. 1, here shown as consisting of separate side straps secured by screws or bolts 42$^d$ to the depending parallel ends 42$^a$ of a strap 42$^b$ looped about the drop 11 and secured thereto by a transverse bolt 42$^c$. The forked hanger 42 has an internally arched reinforce 44 when said hanger is made as shown of separate side straps.

Longitudinal girts 43 are secured at their ends to the hanger 42 by suitable fasteners 46 and the rear ends of said girts are secured by suitable fasteners 47 to the members of rear fork 25 (Figures 1, 3 and 4).

In the form of the backbone and rear fork shown in Figures 6 and 7, the girts 43ª are secured at their front ends as at 46ª to a hanger 42ᵉ and at their rear ends by the bolt 38 to rear fork 25ª. The hanger 42ᵉ is formed of straps the offset upper ends of which are suitably fastened as by bolts or screws 42ᶠ between the sections of the drop portion 11ª of backbone 10ª.

Provision is made for positioning the drive sprocket 40 at the medial line of the velocipede for driving the sprocket 34 or 34ª disposed at the medial line and also for supporting said sprocket in a plane to accord with the shifting of the driven sprocket 34 laterally of the medial line to the position of Figure 4. In the illustrated form the drive sprocket 40 is positioned on the threaded central portion 48ª of axle 48 and is held in adjusted position by set nuts 51.

Figures 8 and 9 illustrate a further modification of the rear fork which may be employed in lieu of the fork 25. The tubular upper end 25ᵇ of the fork in Figures 8 and 9 is employed similarly to the boss 26 in Figures 1, 3 and 4 and carries hangers 25ᶜ secured thereto as by bolts 25ᵈ and provided with suitable bearings as will appear.

In making provision for the embodiment of a chain and sprocket drive in a tricycle or in the converted bicycle form of the invention with the one wheel at the rear, I make provision for mounting the turnable elements in ball bearings notwithstanding these elements in themselves are of a non-ball bearing type including the running wheels and the sprocket wheels. The object is carried out by embodying ball bearing elements in the frame parts such as the forks and hangers. I provide fixed cup-bearing elements 52 rigid with the different rear forks and hangers and suitably made fast therein by brazing or otherwise, the cups constituting one element in the ball race, the coacting element consisting of an internally threaded retainer ring 53 applied to the axle, the fixed bearing element 52 presenting a central opening 54 through which the axle passes freely. The form of the said bearing elements 52, 53 is shown clearly in Figure 7. The balls 54 and the retaining ring 53 thus are free to turn with the turning of the axle and relatively to the fixed bearing element 52 of the frame. Thus, with the running wheels and sprockets fast on the axle and turning therewith, effective ball bearings are provided without employing special wheels embodying ball bearings therein, the ordinary child's bicycle or tricycle wheel being thus made available and at the same time ball bearings are provided for the axles mounting the respective wheels. Substantially the same bearing elements are present in the various forks of Figures 1, 3, 4, Figures 6 and 7, Figures 8 and 9, and the described hangers 42, 42ª. The retaining rings 53 of the bearings may be provided as shown in Figure 6 with wrench holes or recesses 55.

Reverting to the backbone 10ª of Figure 6, said frame is provided with a socket 26ª secured between the sections of the frame and adapted in the rear thereof to receive the seat post 29.

In Figure 11 I illustrate a unit adapted to be applied as such to the rear axle in lieu of the wheel assemblage of Figure 1, said unit comprising a pair of running wheels 31ᵇ and an intermediate sprocket 34ᵇ secured to the adjacent flanges of the respective wheels by transverse bolts 55.

I would state in conclusion that while the illustrated examples constitute practical embodiments of my invention, I do not limit myself strictly to the mechanical details herein illustrated, since manifestly the same can be considerably varied without departure from the spirit of the invention as defined in the appended claims.

Having thus described my invention, I claim:

1. In a velocipede, drive means adapted for either a bicycle or tricycle and including a pedal-operated drive sprocket, an axle therefor, a driven sprocket wheel, an axle for the driven sprocket wheel, a chain running over both sprocket wheels, said sprocket wheels being adjustably mounted on the respective axles for positioning the wheels in different planes to accord with the position of the rear wheel of a bicycle or with a pair of rear wheels of a tricycle.

2. In a velocipede, a frame adapted to be provided with either a single rear wheel to constitute the velocipede, a bicycle or in a pair of rear wheels to constitute said velocipede a tricycle, a front wheel, and a chain and sprocket drive; together with means to mount said drive means in different planes for driving either a single rear wheel or a pair of rear wheels.

3. In a velocipede, a frame adapted to turnably mount a rear axle with a single wheel disposed approximately in the medial plane of a velocipede as in a bicycle, or a pair of rear wheels in planes at opposite sides of the medial line as in a tricycle, and a chain and sprocket drive for the rear axle and adapted to be positioned in planes for driving the axle with a single wheel or one with a pair of wheels.

4. In a velocipede, a chain and sprocket drive means adapted to either a bicycle or a tricycle, and means to support said drive means in different planes for the driving of a tricycle or bicycle.

5. In a velocipede, drive means for a rear axle equipped with a single wheel, to constitute the velocipede a bicycle, or with a pair of wheels to constitute said velocipede a tricycle, and means to adjust the position of said drive means for the driving of the axle with either the single wheel or the pair of wheels.

6. In a velocipede, a frame including a front fork and a rear fork, axles on said forks, front and rear wheels on the respective axles, a pedal-operated drive axle, means on the frame between the front and rear forks in which said axle turns, a drive sprocket on said axle, a sprocket on the rear axle and driven by said drive sprocket, and a chain running over said drive sprocket, said sprockets and the chain being laterally adjustable to position the same in planes for driving the rear axle when provided with one wheel or when provided with two wheels.

7. In a velocipede, a frame including a front fork, an axle in said fork, a front wheel on said axle, means on the frame at the rear for detachably securing a rear fork so that a fork may be applied to the frame with either a single or a pair of wheels to give the velocipede a bicycle or a tricycle form, and drive means variable to positions for driving the rear axle with a single wheel or with a pair of wheels.

8. In a velocipede outfit, a backbone, a front fork therein, a rear fork removably held to said backbone and having an axle extending on each of its ends beyond the rear fork, and wheels on the extending ends of the axle in planes outside of the rear fork.

9. In a velocipede, a frame presenting axle suporting members, a rear axle having means to position a single wheel thereon at the medial line or a pair of wheels at the sides of the medial line, as well as means on said axle to secure a driven sprocket in different positions to accord with the position of a single wheel or the positions of the pair of wheels, and means to drive said sprocket.

JOHN HUDRY.